United States Patent
Xia et al.

(10) Patent No.: US 8,645,398 B2
(45) Date of Patent: Feb. 4, 2014

(54) CROSS-PLATFORM CONTENT POPULARITY RANKINGS

(75) Inventors: Wei Xia, Sudbury, MA (US); Shuai Wu, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 80 days.

(21) Appl. No.: 13/357,126

(22) Filed: Jan. 24, 2012

(65) Prior Publication Data

US 2013/0191401 A1 Jul. 25, 2013

(51) Int. Cl.
*G06F 17/30* (2006.01)

(52) U.S. Cl.
USPC .......................................... 707/751

(58) Field of Classification Search
USPC ................................. 707/751, 748
See application file for complete search history.

(56) References Cited

U.S. PATENT DOCUMENTS

| | | | |
|---|---|---|---|
| 7,801,888 B2 * | 9/2010 | Rao et al. | 707/728 |
| 7,941,428 B2 * | 5/2011 | Huston | 707/722 |
| 2008/0126303 A1 * | 5/2008 | Park et al. | 707/3 |
| 2010/0299692 A1 * | 11/2010 | Rao et al. | 725/14 |
| 2012/0011551 A1 * | 1/2012 | Levy et al. | 725/82 |

* cited by examiner

*Primary Examiner* — Joshua Bullock

(57) ABSTRACT

A method includes receiving popularity measure values for a media asset. The popularity measure values provide a measure of a popularity of the media asset provided in digital content and physical content. Popularity measure value weights for the popularity measure values are identified. A digital ranking score for the media asset in digital content is determined based on the popularity measure values and corresponding popularity measure value weights for the digital content. A physical ranking score is determined for the media asset in physical content based on the popularity measure values and corresponding popularity measure value weights for the physical content. A digital ranking weight and a physical ranking weight are identified for the media asset. The method also includes determining a cross-platform ranking score of the media asset based on the physical ranking score, the physical ranking weight, the digital ranking score, and the digital ranking weight.

19 Claims, 9 Drawing Sheets

| CID | TITLE | DCID | PCID |
|---|---|---|---|
| C1 | MOVIE A | DCID A | PCID A |
| C2 | MOVIE B | DCID B | PCID B |
| C3 | MOVIE C | DCID C | PCID C |
| C4 | MOVIE D | DCID D | PCID D |
| C5 | MOVIE E | DCID E | PCID E |
| C6 | MOVIE F | DCID F | PCID F |
| C7 | MOVIE G | DCID G | PCID G |
| C8 | MOVIE N | DCID H | PCID N |

FIG. 6

| | DIGITAL SEC. 760 | | | | PHYSICAL SEC. 770 | | | |
|---|---|---|---|---|---|---|---|---|
| MEASURE TYPE | MEASURE VALUE | MEASURE VALUE WEIGHT | MEASURE SCORE | MEASURE TYPE | MEASURE VALUE | MEASURE VALUE WEIGHT | MEASURE SCORE |
| | | | | NEW REL. | 1 | 1000 | 1000 |
| | | | | PEND. REL. | 0 | 0 | 0 |
| | | | | KSK. INV. | 20 | 20 | 400 |
| ADD. FORMAT | 1 | 100 | 100 | ADD. FORMAT | 1 | 150 | 150 |
| TRANS. 30 | 5000 | 0.01 | 50 | TRANS. 30 | 1200 | 0.1 | 120 |
| USER RATING | 4 | 100 | 400 | USER RATING | 4 | 100 | 400 |
| MPAA RATING | 5 | 100 | 400 | MPAA RATING | 5 | 100 | 400 |
| SOCIAL MED. | 836,000 | 0.001 | 836 | | | | |
| NO. REVIEWS | 100 | 1 | 100 | NO. REVIEWS | 100 | 1 | 100 |
| PRC. RANGE | 10 | 10 | 100 | | | | |
| BROWSE 30 | 2000 | 0.1 | 200 | BROWSE 30 | 200 | 0.7 | 140 |
| DIGITAL RANKING SCORE 762 | | | 2086 | PHYSICAL RANKING SCORE 772 | | | 2710 |
| DIGITAL RANKING WEIGHT 764 | | | 40% | PHYSICAL RANKING WEIGHT 774 | | | 60% |
| CROSS-PLATFORM RANKING SCORE 780 | | | | | | | 2940 |

FIG. 7B

CROSS-PLATFORM CONTENT POPULARITY RANKINGS

BACKGROUND

Video service providers currently provide multiple services and programs, including cable television, network television, and video on demand, to their customers. In some instances, individual customers may receive combinations of these multiple services from a single video service provider.

BRIEF DESCRIPTION OF THE DRAWINGS

FIG. 6 is a diagram of an exemplary table of a unified catalog;

FIG. 7B is an exemplary cross-platform popularity scoring table; and

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide cross-platform popularity rankings for content. The content may be provided in a digital format on one platform and a physical format on another platform. Digital ranking scores and physical ranking scores may be determined for the content based on popularity measures and corresponding measure value weights. Consistent with embodiments described herein, measurement weights may be predetermined and alternatively adjusted based on commands provided by an administrator of the cross-platform content distribution system.

Figure 1:
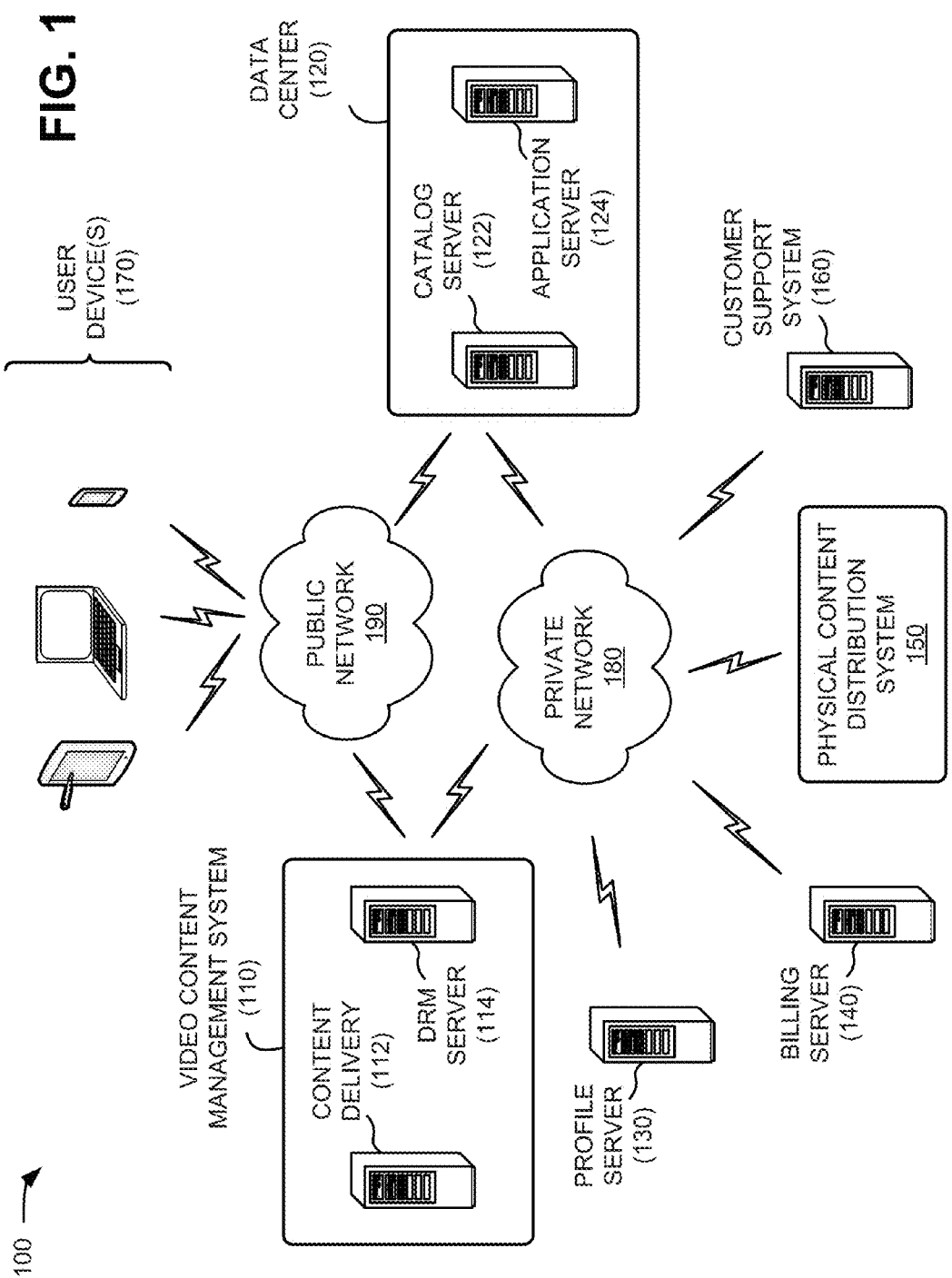
FIG. 1 is an exemplary network in which systems and/or methods described herein may be implemented.

FIG. 1 is an exemplary network 100 in which systems and/or methods described herein may be implemented. As illustrated, network 100 may include a video content management system (VCMS) 110, a data center 120, a profile server 130, a billing server 140, a physical content distribution system 150, a customer support system 160, user devices 170, a private network 180, and a public network 190. The particular arrangement and number of components of network 100 shown in FIG. 1 are illustrated for simplicity. In practice there may be more VCMSs 110, data centers 120, profile servers 130, billing servers 140, physical content distribution systems 150, customer support systems 160, user devices 170, and/or networks 180/190. Components of network 100 may be connected via wired and/or wireless links.

VCMS 110 may aggregate content, process content, and distribute content. In one implementation, VCMS 110 may include a content delivery system 112 and a digital rights management (DRM) server 114. VCMS 110 may aggregate content and transcode content into a digital format suitable for consumption on particular user devices 170. For example, VCMS 110 may include a transcoding device to convert an audio, video, or graphic file from one format to another (e.g., from one bit rate to another bit rate, from one resolution to another, from one standard to another, from one file size to another, etc.). VCMS 110 may also encrypt data and communicate with DRM server 114 to enforce digital rights.

Content delivery system 112 may deliver digital content from a backend server to user devices 170. In one implementation, content delivery system 112 may include a streaming server that provides streaming data packets (e.g., via a streaming URL) to user devices 170 (e.g., via public network 190). In one implementation, a streaming URL may be session-based, such that each URL can be used only once for one user device 170 for security purposes.

DRM server 114 may issue, validate, and/or enforce DRM licenses to a device client, such as an application running on one of user devices 170. In implementations herein, DRM server 114 may communicate with user device 170 to authenticate a user of user device 170, the particular user device 170, and/or an application residing on user device 170. For example, DRM server 114 may request/receive login information associated with the user, and compare the login information with stored information to authenticate the user. Additionally, or alternatively, DRM server 114 may request/receive device information (e.g., a unique device identifier) associated with user device 170, and may compare the device information with stored information to authenticate user device 170.

Data center 120 may manage the authorization, selection, and/or purchase of multimedia content by a user of user devices 170. As shown in FIG. 1, data center 120 may include a catalog server 122 and an application server 124. In one implementation, data center 120 may be accessed by user devices 170 via public network 190.

Catalog server 122 may provide a unified catalog of content in both digital and physical formats for users (e.g., of user devices 170) to order/consume (e.g., buy, rent, or subscribe). In one implementation, catalog server 122 may collect and/or present listings of content available to user devices 170. For example, catalog server 122 may receive digital and/or physical content metadata, such as lists or categories of content, from VCMS 110 and/or physical content distribution system 150. Catalog server 122 may use the content metadata to provide currently-available content options to user devices 170. Catalog server 122 may provide the content metadata to user device 170 directly or may communicate with user device 170 via application server 124.

Application server 124 may provide a backend support system for mobile applications residing on user devices 170. For example, application server 124 may permit user device 170 to download an application that enables a user to find content of interest or play downloaded or streaming content. The application may enable user device 170 to present to a user of user device 170 information received from data center 120 in an interactive format to allow selection of particular digital or physical content. Application server 124 may provide content metadata, such as lists or categories of content for digital content, such as downloads and streaming content, and/or physical content, such as DVDs, Blu-ray discs, or memory cards. Application server 124 may provide the digital content in association with VCMS 110 and the physical content in association with physical content distribution system 150. Also, application server 124 may authenticate a user who desires to purchase, rent, or subscribe to digital or physical content. In one implementation, the interactions between application server 124 and user device 170 may be performed using hypertext transfer protocol (HTTP) or secure HTTP (HTTPS) via public network 190.

Application server 124 may provide cross-platform popularity rankings for the content in a cross-platform content distribution system that includes online digital streaming/downloads of digital content and physical distribution of physical content (e.g., media assets, such as movies, video games, etc., which may be provided as physical content or digital content). Additionally, application server 124 may provide a digital content ranking (i.e., a ranking for the media assets when provided as digital content) and a physical content ranking (i.e., a ranking for the media assets when provided as physical content) for each media asset. Application server 124 may provide cross-platform popularity rankings, digital content rankings, and/or physical content rankings to user devices 170.

Profile server 130 may store user profile information for users (e.g., users of user devices 170). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 140 may manage charging users for services provided via network 100. Billing server 140 may include, for example, a payment processing component, a billing component, and/or a settlement component.

Physical content distribution system 150 may track availability of physical content (e.g., DVDs, Blu-ray discs, memory cards, etc.) and provide metadata relating to the physical content for inclusion in catalog information provided to users of user devices 170. In one implementation, physical content distribution system 150 may also provide physical content information, such as location information, so that when a user wants to buy physical content, the system may direct the user to the nearest location for purchasing the physical content. Additionally, or alternatively, physical content distribution system 150 may generate or receive credit information for users (e.g., for cross-promotion purposes). For example, after a user of user device 170 has purchased digital content or a subscription/rental of digital content, the user may be entitled to credits for obtaining a corresponding physical asset or vice versa.

Customer support system 160 may solicit and/or receive user feedback, questions, or credit-related requests.

User devices 170 may enable a user to view video content or interact with another user device 170 or a video display device (e.g., a set-top box and/or television). User devices 170 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices. In one implementation, user devices 170 may include a client-side application that enables user devices 170 to communicate with, for example, data center 120 and/or present information received from data center 120 to a user. The client-side application may permit a user of a user device 170 to log into an account (e.g., via application server 124), access catalog information (e.g., from catalog server 122), submit an order, and/or consume live streaming video content (e.g., from VCMS 110).

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, physical content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, public network 190 may include a number of separate networks that function to provide services to user devices 170.

In implementations described herein, cross-platform popularity rankings may be provided for content. Additionally, digital ranking scores and the physical ranking scores may be provided for the content. The content may be provided in a digital format on one platform and a physical format on another platform.

Figure 2:
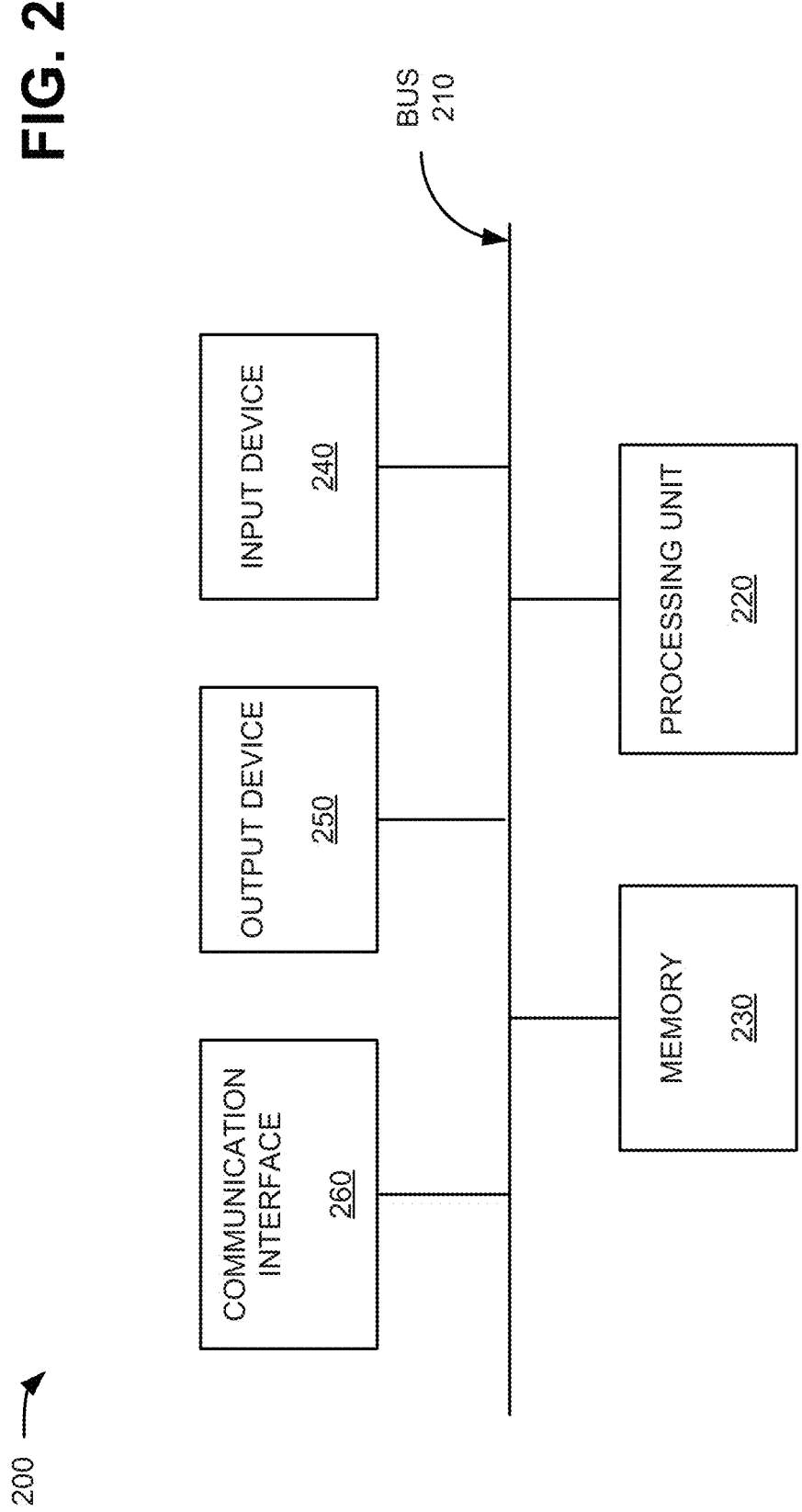
FIG. 2 is a block diagram of exemplary components of a device that may correspond to one of the devices of FIG. 1.

FIG. 2 is a diagram of exemplary components of a device 200 that may correspond to VCMS 110, content delivery system 112, DRM server 114, data center 120, catalog server 122, application server 124, profile server 130, billing server 140, physical content distribution system 150, customer support system 160, or user device 170. Each of VCMS 110, content delivery system 112, DRM server 114, data center 120, catalog server 122, application server 124, profile server 130, billing server 140, physical content distribution system 150, customer support system 160, and user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
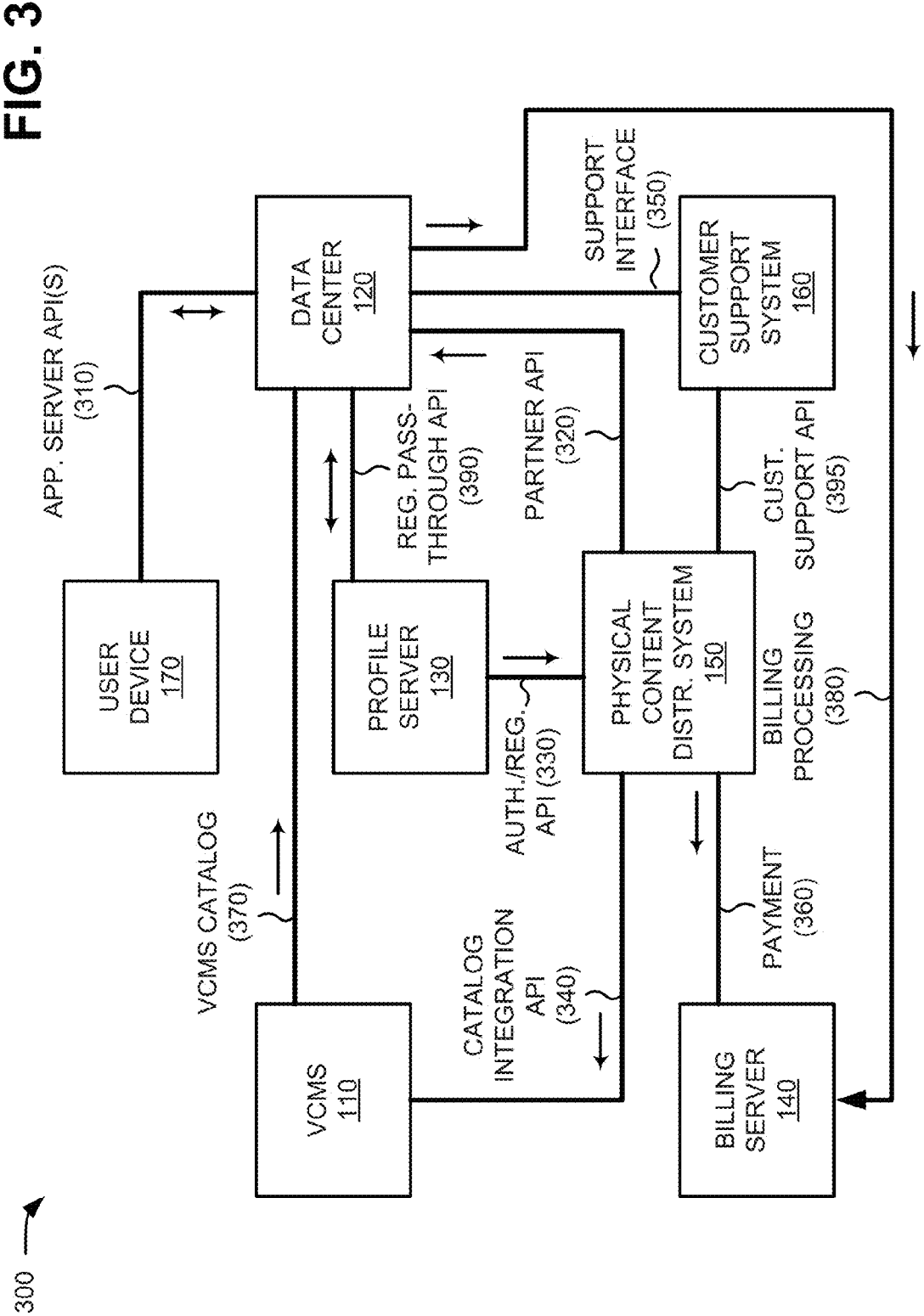
FIG. 3 is a block diagram of exemplary communications between components within a portion of the network of FIG. 1.

FIG. 3 is a diagram of exemplary communications for a portion 300 of network 100. Communications in FIG. 3 may represent communications to support cross-platform popularity rankings for a cross-platform content distribution system that may include physical content and digital content. As shown in FIG. 3, network portion 300 may include VCMS 110, data center 120, profile server 130, billing server 140, physical content distribution system 150, customer support system 160, and user device 170. VCMS 110, data center 120, profile server 130, billing server 140, physical content distribution system 150, customer support system 160, and user device 170 may include features described above in connection with, for example, FIGS. 1 and 2. Although arrows in portion 300 indicate direction of information flows that support a cross-platform popularity ranking process, it should be understood that communications within network portion 300 may be implemented in different manners than indicated by the arrows.

As shown in FIG. 3, user device 170 may request and data center 120 may provide an application server application program interface (API) 310. Data center 120 (e.g., application server 124) may provide different APIs to user device 170 depending, for example, on the type of operating system included on user device 170. For example, application server API 310 may include a web (e.g., web 2.0) API, an Andriod® API, an iOS API, or a Windows Phone® API. Other APIs may be provided for other applications, such as television-embedded applications, smart appliances, etc. API 310 provided by the application server in data center 120 may enable user device 170 to view and/or order content from catalogs provided via data center 120. The content may be delivered in a cross-platform format and may include digital content, which may be associated with one platform (e.g., a platform associated with a first provider, such as a digital content provider) and managed using VCMS 110, and physical content, which may be associated with another platform (e.g. a platform associated with a physical content provider) and managed using physical content distribution system 150.

Data center 120 may provide a partner API 320 to physical content distribution system 150. Partner API 320 may include, for example, an interface to identify/update physical asset locations, conduct authentication and registrations, and/or exchange credit information (e.g., for cross-promotion purposes).

Profile server 130 may provide an authentication and registration API 330 to physical content distribution system 150. Authentication and registration API 330 may permit profile server 130 to register new users with physical content distribution system 150 or to initiate user authentication procedures for physical content distribution system 150. In the case of new user registrations, profile server 130 may collect user information from user device 170 (e.g., via application server 124) and provide the user information to physical content distribution system 150 to create an account in a physical content distribution system 150 database. In the case of authentications of existing user accounts, profile server 130 may collect user login information (e.g., a login name and password) from user device 170 (e.g., via application server 124) and provide the login information to physical content distribution system 150 for authentication. Assuming the user is authenticated by physical content distribution system 150, profile server 130 may generate a session token with a particular expiration time and send the session token to user device 170 (e.g., via application server 124) for future validation.

Physical content distribution system 150 may implement catalog integration API 340 to inform VCMS 110 of physical assets available to users of user devices 170. Physical content distribution system 150 may use catalog integration API 340 to provide catalog descriptions for physical media assets and/or metadata about content on the physical assets, such as titles, formats (e.g., DVD, Blu-ray disc, memory card, etc.), and descriptions. In one implementation, catalog integration API 340 may support delivery of an XML metadata file to VCMS 110.

Customer support system 160 may provide a support interface 350 to data center 120. For example, support interface 350 may include APIs to enable communications with customer support system 160. For example, support interface 350 may provide an avenue to report customer disputes (e.g., originating from user devices 170) from data center 120 to customer support system 160.

Billing server 140 may provide a payment gateway 360 to physical content distribution system 150. Payment gateway 360 may provide a secure system to apply charges (e.g., credit card payments) to a user's account in physical content distribution system 150 for physical content ordered via data center 120. Billing server 140 may also generate internal billing entries for digital content ordered by users and delivered via VCMS 110.

VCMS 110 may include VCMS catalog API 370 to export content metadata to data center 120. For example, VCMS 110 may combine information regarding available digital content (e.g., stored within VCMS 110) and catalog integration information received via catalog integration API 340 into a single unified catalog file. VCMS 110 may provide the unified catalog file to data center 120 using VCMS catalog API 370. VCMS 110 may also provide information identifying a provider and/or platform for each asset included in the unified catalog file. For example, VCMS 110 may provide identifiers in the unified catalog file for each asset that indicates an association of the asset with physical content distribution system 150, and/or an association with VCMS 110.

Data center 120 may provide billing processing information to billing server 140 via billing processing API 380. Billing processing information may include, for example, identification of and/or charges associated with content ordered by users of user devices 170. Billing processing API 380 may be used to support customer billing processes (e.g., for digital content) and fulfill payment transactions (e.g., for physical content).

Registration pass-through API 390 may provide a communication interface for data center 120 to exchange user registration and authentication information with profile server 130. Registration information may include, for example, user information (e.g., name, address, device identifiers, etc.) required to create an account for a user of user device 170. Authentication information may include, for example, information (e.g., a login name and password) to access a user's existing account. Data center 120 may pass registration/authentication information received from user device 170 to policy server 130, and policy server 130 may return validations to data center 120, via registration pass-through API 390.

Customer support API 395 may provide a communication interface to exchange information to resolve customer disputes. For example, customer support API may enable customer support system 160 to submit dispute information to and retrieve account information from physical content distribution system 150.

Although FIG. 3 shows exemplary interfaces between components of network portion 300, in other implementations, network portion 300 may include fewer interfaces, different interfaces, differently arranged interfaces, or additional interfaces than depicted in FIG. 3. Alternatively, or additionally, one or more interfaces of network portion 300 may perform one or more other tasks described as being performed by one or more other interfaces of network portion 300.

Figure 4:
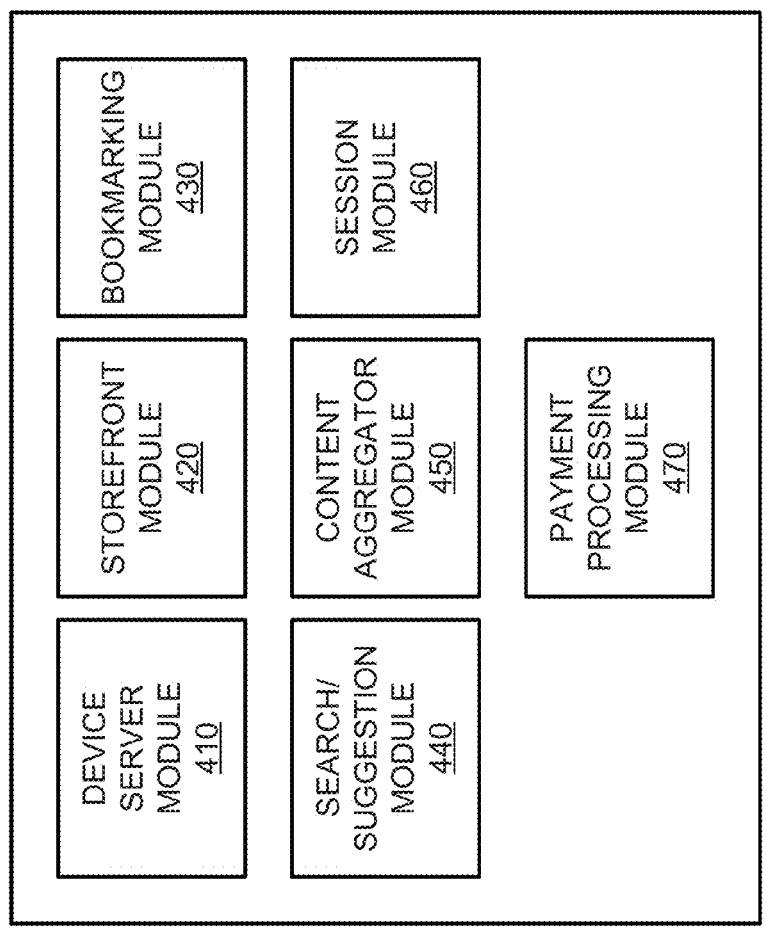
FIG. 4 is a diagram of exemplary functional components of the application server of FIG. 1.

FIG. 4 is a diagram of exemplary functional components of application server 124. In one implementation, the functions described in connection with FIG. 4 may be performed by one or more components of device 200 (FIG. 2). As shown in FIG. 4, application server 124 may include a device server module 410, a storefront module 420, a bookmarking module 430, a search/suggestion module 440, a content aggregator module 450, a session module 460, and a payment processing module 470.

Device server module 410 supports interactions between user devices 170 and backend servers, including (but not limited to) catalog server 122, content delivery system 112, and DRM server 114. Device server module 410 may determine which content format to use according to the device type or platform. Device server module 410 may also aggregate content from different servers according to requests from user devices 170. In one implementation, device server module 410 may also temporarily cache some content locally for performance purposes.

Storefront module 420 provides a user interface to enable users to review and select content in a variety of formats, including digital content and physical content. Storefront module 420 may support browsing and searching of the catalog (e.g., a unified catalog compiled by catalog server 122) from user devices 170. Storefront module 420 may also provide an electronic shopping cart, transaction management, and/or promotions and advertisements.

Bookmarking module 430 tracks user viewing position (e.g., within particular digital content) and allows users of user devices 170 to view the content from the most recently viewed position. In one implementation the most recently viewed position may be based on viewing from the same user device 170. In another implementation the most recently viewed position may be based on the user account (e.g., regardless of the particular user device 170). For example, when a user starts to view a video, bookmarking module 430 may asks a user where to start the presentation, the beginning or where it was stopped from last time.

Search/suggestion module 440 provides a user interface to enable a user to search the catalog by keywords or review content suggestions or recommendations. Search/suggestion module 440 may recommend particular content to the user based on the user's search terms, profile, viewing history, or previously purchased content. Search/suggestion module 440 can also recommend physical assets based on the digital viewing history or personal preferences.

Search/suggestion module 440 may provide cross-platform popularity rankings for content to user devices 170, as described below. Search/suggestion module 440 may also provide digital ranking scores and physical ranking scores.

Content aggregator module 450 aggregates information from Internet searching and social networks related to particular content (e.g., a program or video) for a user to view and share. In one implementation, content aggregator module 450 may provide links or other menu options to enable a user to select related content provided by content aggregator module 450.

Session module 460 receives user login information and forwards the user login information to policy server 130 for validation. For example, session module may collect user login information from user device 170 and forward the login information to policy server 130. Assuming the user is authenticated (e.g., by policy server 130 or physical content distribution system 150), session module 460 may receive a session token and send the session token to user device 170.

Payment processing module 470 may include an interface with billing server 140 to bill the customer for the transaction of a purchase, a rental or a subscription. In one implementation, payment processing module 470 may also include a credit exchange interface with physical content distribution system 150. For example, when a user purchases digital content, coupon credits for getting physical media (e.g., DVDs or Blu-ray discs) may be deposited to a user account associated with physical content distribution system 150.

Figure 5:
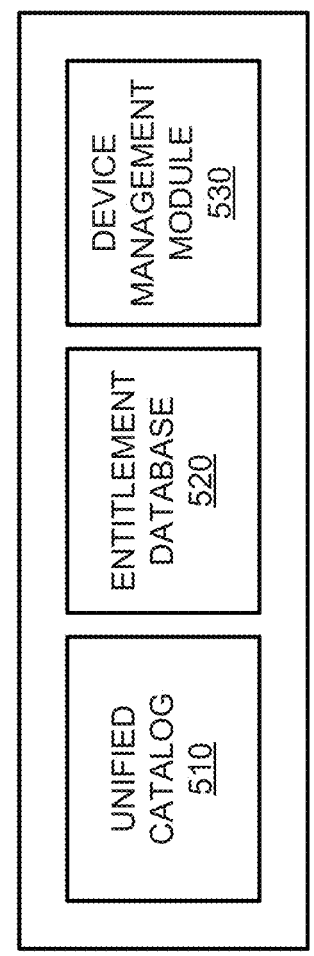
FIG. 5 is a diagram of exemplary functional components of the catalog server of FIG. 1.

FIG. 5 is a diagram of exemplary functional components of catalog server 122. In one implementation, the functions described in connection with FIG. 5 may be performed by one or more components of device 200 (FIG. 2). As shown in FIG. 5, catalog server 122 may include a unified catalog 510, an entitlement database 520, and a device management module 530. FIG. 6 illustrates table 600 showing exemplary information contained in unified catalog 510. Although unified catalog 510 is described with respect to catalog server 122, unified catalog 510 may be implemented in other parts of network 100. Additionally, catalog server 122 may be implemented to provide other types of catalogs in network 100. The particular arrangement and number of components and/or entries in catalog server 122 and table 600 as shown in FIGS. 5 and 6 are illustrated for simplicity.

Unified catalog 510 includes a unified catalog of content available for all users to buy, rent or subscribe to, in a cross-platform content distribution system, such as shown in network 100 (FIG. 1). In one implementation, unified catalog 510 may be received from VCMS 110 and updated at periodic intervals.

Each media asset in table 600 (FIG. 6) may be assigned a unique cross-platform identifier (CID) 602. Unified catalog 510 may also include a title 604 for each content asset, e.g. "Movie A", "Movie B", etc. For each asset, unified catalog 510 may also include a digital content ID (DCID) 606 that may be associated with the media asset in a digital platform (e.g. VCMS 110), and a physical content ID (PCID) 608 that may be associated with the media asset in a physical platform (e.g. physical content distribution system 150).

Entitlement database 520 includes entitlement profiles for particular users. An entitlement profile may associate particular user devices 170 or platforms with particular types of content. Entitlement database 520 includes entitlement rules associated with a user's profile and may indicate terms of usage associated with content, such as a right to transfer, a limited duration (i.e., rental) right, etc. In one implementation, profiles in entitlement database 520 may be added/deleted/changed by a user via interactions with application server 124.

Device management module 530 associates unified catalog 510 with a user's entitlement profile in entitlement database 520 to enforce rules that dictate what content the user can view on which device. For example, if a user bought a particular movie, the user may be able to view the movie on only certain user devices 170 (e.g., a television, a personal computer, and/or or registered mobile devices). In one implementation, device management module 530 may verify entitlement before a DRM license can be issued to the user device 170.

Figure 7A:
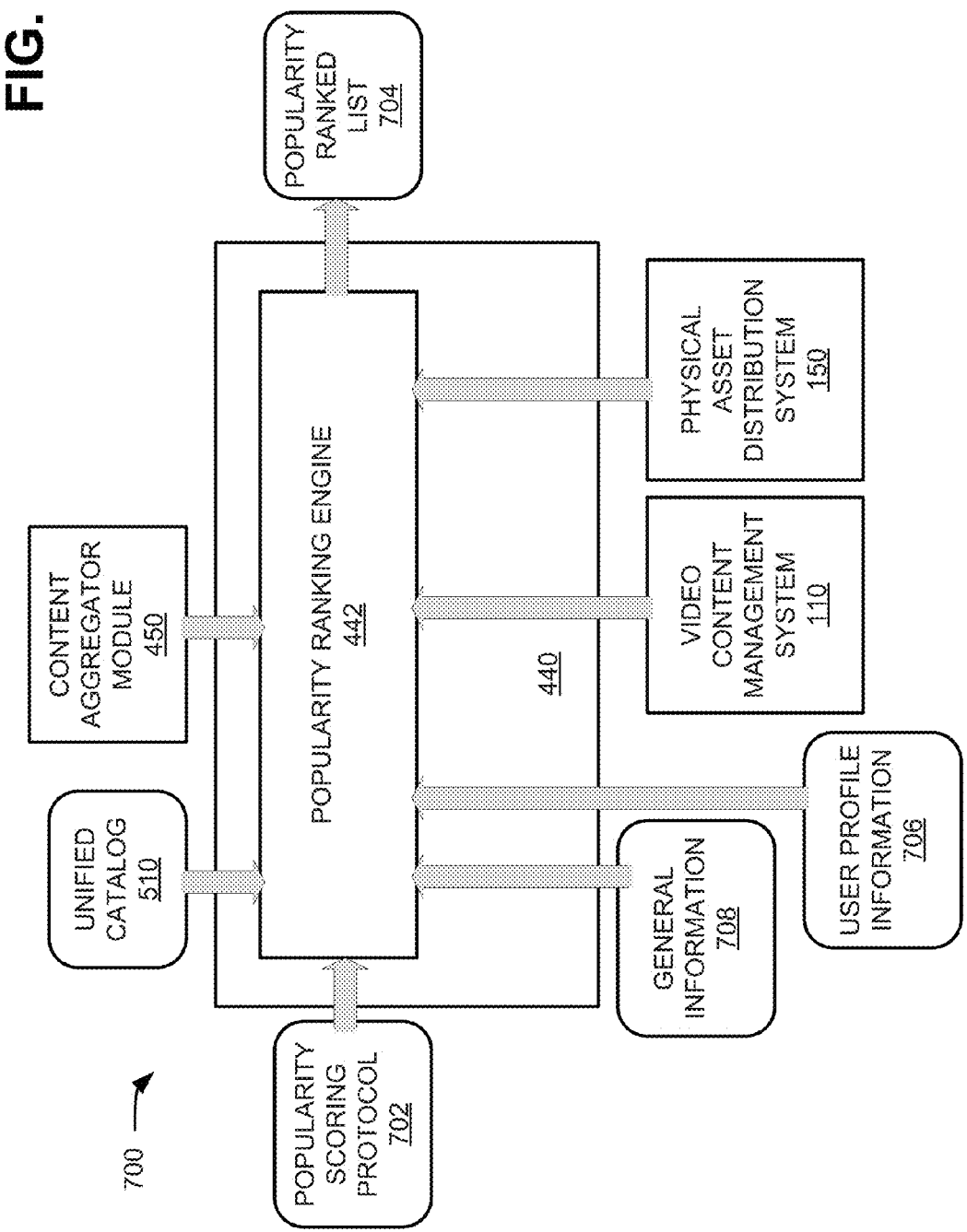
FIG. 7A is an exemplary functional block diagram of a portion of a network used for providing cross-platform popularity rankings consistent with embodiments described herein.

FIG. 7A is a cross-platform popularity ranking data flow diagram 700 for a portion of network 100. As shown in FIG. 7A, cross-platform popularity ranking data flow 700 may include search/suggestion module 440 and content aggregator module 450 (i.e., a portion of application server 124, such as described with respect to FIG. 4), VCMS 110, and physical content distribution system 150. The particular arrangement and number of components in data flow diagram 700 as shown in FIG. 7A is illustrated for simplicity.

As shown in FIG. 7A, search/suggestion module 440 may access a popularity scoring protocol 702. Popularity scoring protocol 702 may indicate popularity measure types and popularity measure value weights for popularity measures that are to be collected and a manner in which the popularity measures are to be combined to determine a popularity ranked list 704 of content that may be provided by the cross-platform content distribution system. The popularity measures may provide relative measures of the popularity of media assets that are to be included in popularity ranked list 704. For example, popularity measures may include user ratings of content, recent activity (e.g., a number of times that content is bought, rented, browsed, etc., within a defined time), awards, etc. Popularity measure value weights are a weighting factor for each popularity measure for different types of content provided in the cross-platform content distribution system (e.g., a weighting factor may be provided for user ratings associated with digital content).

In one embodiment, search/suggestion module 440 may receive popularity scoring protocol 702 from a data storage associated with application server 124 when a user requests (via user device 170) a popularity ranked list 704 of content, including digital content and physical content, which may be provided by the cross-platform content distribution system. The request for popularity ranked list 704 may include a predetermined number of media assets that are to be included in popularity ranked list 704 based on popularity measures for the content. Popularity scoring protocol 702 may also include an indication of content specific activity, such as when a user browses, rents, and/or purchases particular content, etc.

According to one embodiment, based upon selection by the user or an administrator for the cross-platform content distribution system, popularity scoring protocol 702 may indicate popularity measures that identify, and correlate with, generally popular content, seasonally popular content (e.g., Christmas films, Halloween films, etc.), special interest (e.g., kids movies, foreign films, etc.), demographically popular content (i.e., content popular for a particular demographic, in which a user of user device 170 may be included), etc., for the cross-platform content distribution system. For example, seasonal films may be determined based on a historical analysis of activity for the content within an annual time range, such as the month of October for Halloween films. Content may also be selected based on common keywords in metadata for the media assets.

Search/suggestion module 440 may include a popularity ranking engine 442 that determines popularity ranked list 704 based on popularity scoring protocol 702. Popularity ranking engine 442 may receive information regarding popularity measures from a combination of sources including the user, the digital platform (e.g., VCMS 110), the physical platform (e.g. physical content distribution system 150), and general sources (e.g. content aggregator module 450). The sources may provide the information on an ongoing automatic basis and/or on request from popularity ranking engine 442.

Popularity ranking engine 442 may receive user profile information 706 for a user, for example from profile server 130. Popularity ranking engine 442 may receive an indication of general user activity that may be generated by user device 170 when a user "signs on" to a user device 170 and/or user device 170 accesses a specific interface, such as a user interface for selecting content. Popularity ranking engine 442 may request user profile information for the user of user device 170 from profile server 130. Popularity ranking engine 442 may receive user profile information 706, for example from profile server 130, based on an identification of the user. User profile information 706 may include various information regarding a user, such as described above with respect to profile server 130 and FIG. 1, including content rented, browsed, and/or purchased by the user.

Popularity ranking engine 442 may receive information regarding activity for digital content from VCMS 110. For example, popularity ranking engine 442 may request, and VCMS 110 may provide, information regarding instances in which digital content included in catalog 510 has been rented, purchased, or browsed, within a particular time frame.

Popularity ranking engine 442 may receive information regarding activity for physical content from physical content distribution system 150. For example, popularity ranking engine 442 may request, and physical content distribution system 150 may provide, information regarding instances in which physical content included in catalog 510 has been rented, purchased, or browsed, within a particular time.

Popularity ranking engine 442 may receive information regarding activity for content from general sources, such as the Internet, via content aggregator module 450. For example, popularity ranking engine 442 may receive information regarding social media metrics for particular media assets (e.g., Facebook "likes", Twitter tweets or hash tag mentions, etc., for the particular media asset). Popularity ranking engine 442 may also receive user reviews, user ratings, award information (e.g., Emmy's, Golden Globes, etc.).

Popularity ranking engine 442 may access unified catalog 510 and determine popularity ranked list 704, using the received popularity measures received from the combination of sources including user device 170, VCMS 110, physical content distribution system 150, content aggregator module 450, and popularity scoring protocol 702, for instance as described with respect to popularity scoring table 750 in FIG. 7B hereinbelow.

FIG. 7B illustrates an exemplary cross-platform popularity scoring table 750. Table 750 includes information for, and related to, an exemplary media asset, for example a particular film. The information may be received from user device 170, VCMS 110, physical content distribution system 150, and content aggregator module 450, etc. Popularity ranking engine 442 may use the information to determine a digital ranking score 762, a physical ranking score 772, and a cross-platform ranking score 780 for the media asset. Table 750 includes information regarding the media asset provided as digital content (i.e., digital formats used to provide the media asset) under a digital section header (digital sec.) 760 and information regarding the media asset provided as physical content (i.e., physical formats used to provide the media asset) under a physical section header (physical sec.) 770. Table 750 is shown with particular measure types 782, measure values 784, measure value weights 786, and measure scores 788 for digital content and physical content.

As shown in table 750, measure types 782 may be received for both physical content (under physical sec. 770) and digital content (under digital sec. 760). Measure types 782 may include additional (add.) format, transactions within a predetermined time (trans. 30), user rating, Motion Picture Association of America (MPAA) rating, social media metrics (social med.), number of reviews (no. reviews), price range (prc. range), number of times content is browsed (browse), new release (new rel.), pending release (pend. rel.), kiosks at which the content is inventoried (ksk. inv.), etc.

Additional format is a measure type 782 that indicates whether there are additional formats within the content type that the media asset may be provided. Additional formats may receive a measure value 784 of 0, if there are no additional formats available, or a corresponding measure value 784 of 1 if an additional format is available. For example, under digital sec. 760, additional formats for digital content may be high definition (HD) content, and/or 3D content. A corresponding measure value 784 of 1 indicates that HD content is available for the media asset. Similarly, under physical sec. 770, an additional format may be Blu-ray discs. A corresponding measure value 784 of 1 indicates that Blu-ray discs are available for the media asset.

Transactions within a predetermined time is a measure type 782 that indicates a number of transactions for the media asset within a particular time, for instance a previous 30 days, as shown in FIG. 7B. For example, under digital sec. 760, a measure value 784 of 5,000 may indicate that the media asset has been digitally rented and bought 5,000 times in the previous 30 days. Similarly, under physical sec. 770, a measure value of 1,200 indicates that the media asset has been rented as physical content (e.g., from a kiosk) 1,200 times in the last 30 days. Note that the transaction time frame may be adjusted based on administrator or user input.

User rating is a measure type 782 that indicates a user rating for the media asset. User ratings may be provided on a linear range (e.g. user ratings ranging from 0 to 5) as an approximate average of user ratings received for the media asset from individual users. User ratings may be received in a variety of ways. For example, user ratings may be entered from electronic surveys and physical surveys (e.g., data entered from feedback cards into physical content distribution system 150. User rating may be applied to both digital content and physical content.

MPAA rating is a measure type 782 that indicates an MPAA rating for the media asset. MPAA ratings may be G for general audiences, PG-13 for parental guidance thirteen, etc. MPAA ratings may be assigned different integer values on a linear integer range (e.g. PG-13 may be assigned a value of 5, G may be assigned a value of 4, etc.). MPAA ratings may be applied to both digital content and physical content.

Social media metrics is a measure type 782 that indicates social media metrics related to the popularity of the media asset. For example, social media metrics may include Facebook "likes", etc. A measure value 784 of 836,000 indicates that 836,000 people "liked" the media asset on social media. Social media metrics may be applied to digital content. Alternatively, social media metrics may be applied to digital content and physical content in predetermined proportions provided by an administrator (e.g., a fifth of the measure type 782 may be applied to physical content and the remaining four fifths may be applied to digital content).

Number of reviews is a measure type 782 that indicates a number of reviews for the media asset. A measure value 784 of 100 indicates that the media asset was reviewed 100 times. Number of reviews may be applied to both digital content and physical content.

Price range is a measure type 782 that indicates a price range for the media asset. A measure value 784 of 10 indicates that the media asset is priced in a range of 10 dollars. Price range may be applied to digital content.

Number of times content is browsed is a measure type 782 that indicates a number of times the content is browsed, for example, web page browsing or browsing from a kiosk, in a previous time, e.g. a previous 30 days. A measure value 784 of 2,000 indicates that the media asset was browsed 2,000 times. Number of times content is browsed may be applied to both digital content and physical content.

New release (measure values 784 of 0 for no, 1 for yes) is a measure type 782 that indicates whether the media asset is a new release in digital content or physical content. New release may be applied to physical content.

Pending release (measure values 784 of 0 for no, 1 for yes) is a measure type 782 that indicates whether the media asset is to be released in an upcoming time. Pending release may be applied to physical content.

Kiosks at which the content is inventoried is a measure type 782 that indicates a number of kiosks that have the physical content in inventory. A measure value 784 of 20 indicates that the media asset is inventoried at 20 kiosks. Kiosks at which the content is inventoried may be applied to physical content.

According to one implementation, popularity ranking engine 442 may use measure values 784, and measure value weights 786 (e.g., as shown in table 750) and apply popularity scoring protocol 702 to determine a digital ranking score and physical ranking score for the media asset. Popularity ranking engine 442 may determine the digital ranking score 762 and physical ranking score 772 for the media asset based on popularity measures and corresponding measure value weights 786. For example, popularity ranking engine 442 may apply, $$\text{Ranking score} = (\text{measure value 1} * \text{measure value weight 1}) + \ldots + (\text{measure value N} * \text{measure value weight N}), \quad \text{(Eqn. 1)}$$

for measure values 784 (1–N), and measure value weights 786 (1–N), under digital sec. 760 to determine a digital ranking score 762 for digital content for the media asset. Similarly, popularity ranking engine 442 may apply Eqn. 1 to measure values 784 (1–N), and measure value weights 786 (1–N), under physical sec. 770 to determine a physical ranking score 772 for the media asset.

Popularity ranking engine 442 may combine the digital ranking score 762 and the physical ranking score 772 to determine cross-platform ranking score 780 that measures both physical and digital assets. According to one implementation, popularity ranking engine 442 may apply, $$\text{Cross-platform ranking score} = \text{digital ranking score} * \text{digital ranking weight} + \text{physical ranking score} * \text{physical ranking weight}, \quad \text{(Eqn. 2)}$$

to determine a cross-platform ranking score 780 for the media asset.

In one embodiment, popularity ranking engine 442 may select the digital ranking weight 764 and/or the physical ranking weight 774 based on demographics of a user associated with a receiving user device. For example, popularity ranking engine 442 may increase the physical ranking weight 774 for users above a certain age.

Popularity ranking engine 442 may order or list media assets based on highest popularity ranking scores 780. For example, popularity ranking engine 442 may select the media assets with the ten highest popularity ranking scores 780 and provide the popularity ranked list 704 to a user device 170. Measure value weights 786 are predefined and may be adjusted based on input provided by an administrator of network 100 or an end user of user device 170. For example, popularity ranking engine 442 may adjust (i.e., increase or decrease) the relevance of new releases to the popularity ranking score of the media assets by increasing or decreasing the measure value weight 786 for new releases and/or overall physical ranking weight 774.

In one implementation, popularity ranking engine 442 may adjust the measure value weights based on a transaction history associated with the user device 170. For example, popularity ranking engine 442 may increase the measure value weights for new releases for a user that primarily purchases and/or rents new releases. Popularity ranking engine 442 may also adjust the measure value weights based on administrative input and/or end user input.

Figure 8:
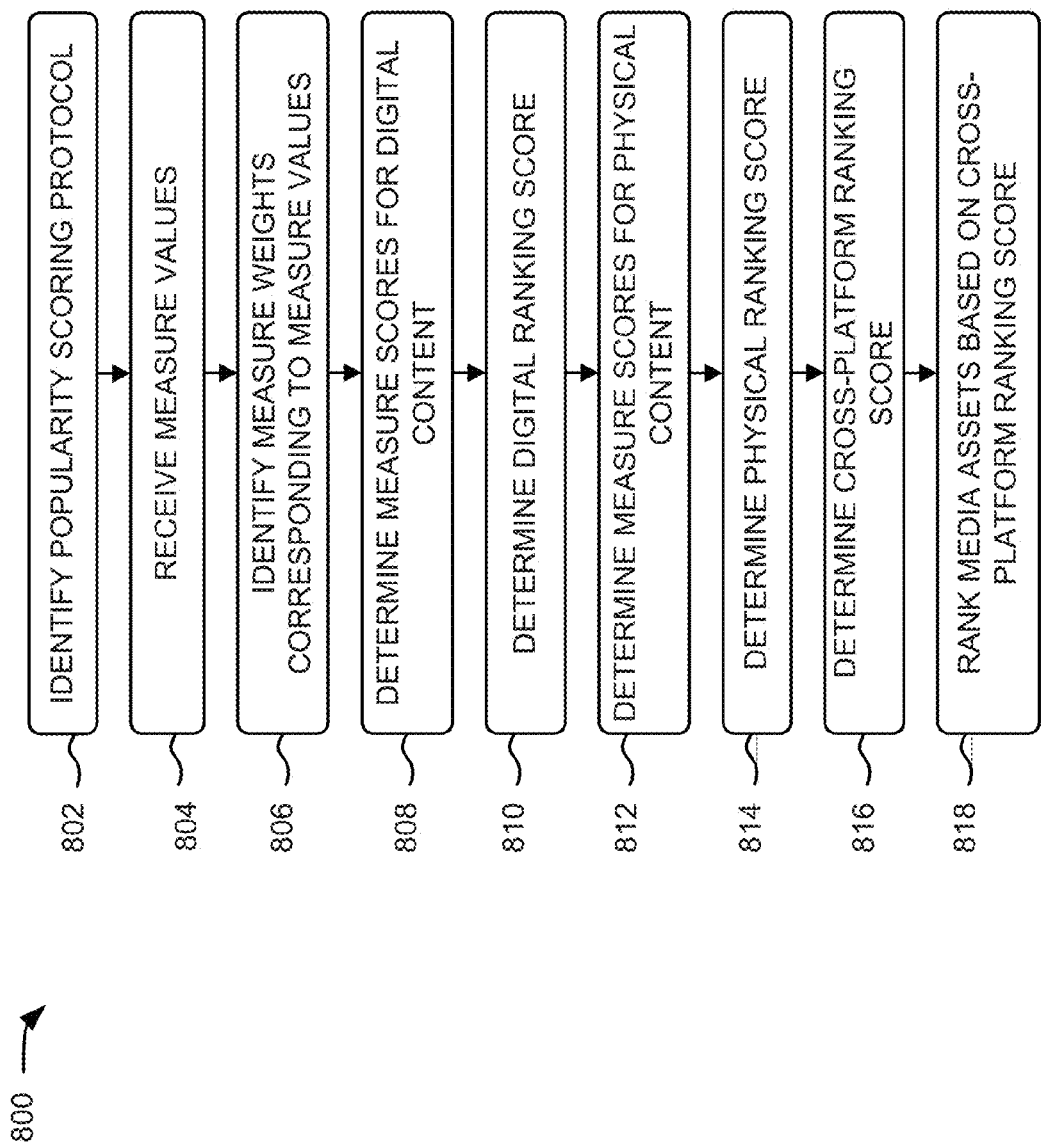
FIG. 8 is a flow chart of an exemplary process for providing cross-platform popularity rankings according to an implementation described herein.

FIG. 8 is a flow chart of an exemplary process for determining cross-platform popularity rankings according to implementations described herein. Process 800 is described with respect to table 750, shown in FIG. 7B, for illustrative purposes. In one implementation, process 800 may be performed by popularity ranking engine 442. In another implementation, some or all of process 800 may be performed by another device or group of devices, including or excluding popularity ranking engine 442.

As shown in FIG. 8, popularity ranking engine 442 may identify a popularity scoring protocol 702 (block 802). For example, popularity ranking engine 442 may access popularity scoring protocol 702 in a data storage associated with application server 124. Popularity scoring protocol 702 may indicate popularity measure types 782 and popularity measure value weights 786 for popularity measures that are to be collected and a manner in which the popularity measures are to be combined to determine a popularity ranked list 704 of content that may be provided by the cross-platform content distribution system.

At block 804, popularity ranking engine 442 may receive measure values 786. Popularity ranking engine 442 may receive measure values 786 that are applicable to the media asset provided in digital content and/or physical content. For example, popularity ranking engine 442 may receive measure values 786 for each measure type 782 for the media asset provided in digital content from VCMS 110, such as digital content purchased, etc. Popularity ranking engine 442 may receive measure values 786 for each measure type 782 for the media asset provided in physical content from physical content distribution system 150, such as physical content purchased, etc. Popularity ranking engine 442 may also receive measure values 786, such as user ratings, that may be applied to both digital content and physical content, for example via content aggregator module 450.

Popularity ranking engine 442 may identify measure value weights 786 corresponding to each measure value for the media asset provided in digital content and for the media asset provided in physical content (block 806). Popularity ranking engine 442 may determine a measure score 788 for each measure type 782 for digital content (block 808). For example, popularity ranking engine 442 may multiply the measure value 784 by a corresponding measure value weight 786 to determine a measure score 788 for each measure type for digital content.

Popularity ranking engine 442 may add the measure scores 788 for the measure types 782 to determine a digital ranking score 762 for the media asset (block 810).

Popularity ranking engine 442 may determine a measure score 788 for each measure type 782 for physical content (812). For example, popularity ranking engine 442 may multiply the measure value 784 by a corresponding measure value weight 786 to determine a measure score 788 for each measure type for physical content.

Popularity ranking engine 442 may add the measure scores 788 for the measure types 782 to determine a physical ranking score 772 for the media asset (814).

Popularity ranking engine 442 may determine a cross-platform ranking score 780 for the media asset (816). For example, popularity ranking engine 442 may combine the physical ranking score 772 and the digital ranking score 762 to determine the cross-platform ranking score 780 for the media asset. In one implementation, popularity ranking engine 442 may assign a digital ranking weight 764 to the digital ranking score 762 and a physical ranking weight 774 to the physical ranking score 772.

Popularity ranking engine 442 may rank the media asset among a plurality of media assets based on relative digital ranking score 762, physical ranking scores 774, and cross-platform ranking score 780. For example, blocks 802 to 816 may be performed for each media asset in unified catalog 510 or alternatively, blocks 802 to 816 may be performed for media assets in unified catalog 510 based upon particular criteria, such as release date of the media assets, key words contained in metadata for the media asset, genre of the media asset, etc., for example identified in user profile information 706 for an account associated with user device 170.

Systems and/or methods described herein may allow user devices to provide cross-platform popularity rankings for media assets that include online digital streaming/downloads and physical distribution of physical content, such as DVDs, Blu-ray discs, or memory cards. Cross-platform popularity rankings may be provided to users based on administrative input and/or user input for measure values and measure value weights.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   receiving one or more popularity measure values for at least one media asset, wherein the popularity measure values provide a measure of a popularity of the at least one media asset provided in one or more of digital content and physical content;
   identifying popularity measure value weights for each of the one or more popularity measure values for the at least one media asset provided in digital content and the at least one media asset provided in physical content,
   determining a digital ranking score for the at least one media asset in digital content based on the one or more popularity measure values and corresponding popularity measure value weights for the digital content, wherein the digital ranking score is a measure of the popularity of the at least one media asset in digital content;
   determining a physical ranking score for the at least one media asset in physical content based on the one or more popularity measure values and corresponding popularity measure value weights for the physical content, wherein the physical ranking score is a measure of the popularity of the at least one media asset in physical content;
   identifying a digital ranking weight and a physical ranking weight for the at least one media asset; and
   determining a cross-platform ranking score of the at least one media asset using the expression:

cross-platform ranking score=digital score*digital ranking weight+physical ranking score*physical ranking weight.

2. The computer-implemented method of claim 1, wherein the at least one media asset is a plurality of media assets, further comprising:
   determining a cross-platform ranking score for each of the plurality of media assets; and
   ranking the plurality of media assets based on the cross-platform ranking scores.

3. The computer-implemented method of claim 1, further comprising:
   selecting the digital ranking weight and the physical ranking weight based on demographics of a user associated with a receiving user device.

4. The computer-implemented method of claim 1, further comprising determining one or more of the digital ranking score and the physical ranking score using the expression:

ranking score=(measure value 1*measure value weight 1)+ . . . +(measure value N*measure value weight N).

5. The computer-implemented method of claim 1, further comprising:
   selecting the at least one media asset from one or more of seasonally popular content, special interest content, and demographically popular content.

6. The computer-implemented method of claim 1, further comprising:
   adjusting one or more of the measure value weights based on a transaction history associated with a receiving user device.

7. The computer-implemented method of claim 1, further comprising: adjusting one or more of the measure value weight based on one or more of administrative input or end user input.

8. The computer-implemented method of claim 1, wherein the measure values are selected from measure value types including one or more of additional format, transactions within a predetermined time, user rating, Motion Picture Association of America rating, social media metrics, number of reviews, price range, number of times content is browsed, new release, pending release, or kiosks at which the content is inventoried.

9. A device, comprising:
   a memory to store a plurality of instructions; and
   a processor configured to execute instructions in the memory to:
      receive one or more popularity measure values for a media asset, wherein the popularity measure values provide a measure of a popularity of the media asset provided in one or more of digital content and physical content;
      identify popularity measure value weights for each of the one or more popularity measure values for the media asset provided in digital content and the media asset provided in physical content,
      determine a digital ranking score for the media asset in digital content based on the one or more popularity measure values and corresponding popularity measure value weights for the digital content, wherein the digital ranking score is a measure of the popularity of the media asset in digital content;

determine a physical ranking score for the media asset in physical content based on the one or more popularity measure values and corresponding popularity measure value weights for the physical content, wherein the physical ranking score is a measure of the popularity of the media asset in physical content;

identify a digital ranking weight and a physical ranking weight for the media asset; and determine the cross-platform ranking score using the expression;

cross-platform ranking score=digital ranking score*digital ranking weight+physical ranking score*physical ranking weight.

10. The device of claim 9, wherein the processor is further configured to:
rank the media asset among a plurality of media assets based on the cross-platform ranking score.

11. The device of claim 9, wherein the processor is further configured to:
select the media asset from one or more of seasonally popular content, special interest content, and demographically popular content.

12. The device of claim 9, wherein the processor is further configured to:
determine the digital ranking score by, digital ranking score=(measure value 1*measure value weight 1)+ . . . +(measure value N*measure value weight N), wherein the measure values (1–N) and measure value weights (1–N) are selected based on popularity measures for digital content.

13. The device of claim 9, wherein the processor is further configured to:
determine the physical ranking score by, physical ranking score=(measure value 1*measure value weight 1)+ . . . +(measure value N*measure value weight N), wherein the measure values (1–N) and measure value weights (1–N) are selected based on popularity measures for physical content.

14. The device of claim 9, wherein the processor is further configured to:
select the media asset from one or more of seasonally popular content, special interest content, and demographically popular content.

15. The device of claim 9, wherein the processor is further configured to:
adjust one or more of the measure value weights based on a transaction history associated with a receiving user device.

16. The device of claim 9, wherein the processor is further configured to:
select the measure values from measure value types including one or more of additional format, transactions within a predetermined time, user rating, Motion Picture Association of America rating, social media metrics, number of reviews, price range, number of times content is browsed, new release, pending release, or kiosks at which the content is inventoried.

17. A non-transitory computer-readable medium including instructions to be executed by a processor, the instructions including one or more instructions, when executed by the processor, for causing the processor to:

receive one or more popularity measure values for a media asset, wherein the popularity measure values provide a measure of a popularity of the media asset provided in one or more of digital content and physical content;

identify popularity measure value weights for each of the one or more popularity measure values for the media asset provided in digital content and the media asset provided in physical content, determine a digital ranking score for the media asset in digital content based on the one or more popularity measure values and corresponding popularity measure value weights for the digital content, wherein the digital ranking score is a measure of the popularity of the at least one media asset in digital content;

determine a physical ranking score for the media asset in physical content based on the one or more popularity measure values and corresponding popularity measure value weights for the physical content, wherein the physical ranking score is a measure of the popularity of the media asset in physical content;

identify a digital ranking weight and a physical ranking weight for the at least one media asset; and determine a cross-platform ranking score of the at least one media asset using the expression:

cross-platform ranking score=digital ranking score*digital ranking weight+physical ranking score*physical ranking weight.

18. The non-transitory computer-readable medium of claim 17, wherein the one or more instructions further includes instructions to:
select the media asset based on metadata associated with a user account.

19. The non-transitory computer-readable medium of claim 17, wherein the one or more instructions further includes instructions to:
select the measure values from measure value types including one or more of additional format, transactions within a predetermined time, user rating, Motion Picture Association of America rating, social media metrics, number of reviews, price range, number of times content is browsed, new release, pending release, or kiosks at which the content is inventoried.

* * * * *